United States Patent [19]
Aono et al.

[11] Patent Number: 6,034,691
[45] Date of Patent: Mar. 7, 2000

[54] RENDERING METHOD AND APPARATUS

[75] Inventors: Masaki Aono; Ryutarou Ohbuchi, both of Yokohama; Kazuya Shimizu, Chiba-ken, all of Japan

[73] Assignee: International Business Machines Corporation, Armonk, N.Y.

[21] Appl. No.: 08/902,270

[22] Filed: Jul. 29, 1997

[30] Foreign Application Priority Data

Aug. 30, 1996 [JP] Japan .................................. 8-230005

[51] Int. Cl.[7] .................................................. G06T 15/10
[52] U.S. Cl. ........................ 345/425; 345/426; 345/430; 345/434
[58] Field of Search ................................... 345/425, 426, 345/430, 419, 427, 441, 434, 422, 423, 424

[56] References Cited

U.S. PATENT DOCUMENTS

| | | | |
|---|---|---|---|
| 5,704,024 | 12/1997 | Voorhies et al. | 345/426 |
| 5,710,876 | 1/1998 | Peercy et al. | 345/426 |
| 5,877,769 | 3/1999 | Shinohara | 345/425 |

OTHER PUBLICATIONS

N. Greene, "Environment Mapping and Other Applications of World Projections", *IEEE*, Nov. 1986, pp. 21–29.

D. Voorhies, et al., "Reflection Vector Shading Hardware", *Computer Graphics Proceedings, Annual Conference Series*, 1994, pp. 163–166.

S. E. Chen, "QuickTime® VR—An Image–Based Approach to Virtual Environment Navigation", *Computer Graphics Proceedings, Annual Conference Series*, 1995, pp. 28–39.

A. Watt et al., "Chapter 8 Ray tracing I: basic recursive ray tracing, Chapter 9 Ray tracing II: practical ray tracing and Chapter 10 Ray tracing III: advanced ray tracing models", *Advanced Animation and Rendering Techniques, Theory and Practice*, 1992, pp. 219–265.

S. Upstill, "Chapter 12: Surface Mapping", *The Render-Man™ Companion, A Programmer's Guide to Realistic Computer Graphics*, 1990, pp. 239–271.

*Primary Examiner*—Mark K. Zimmerman
*Assistant Examiner*—Kimbinh T. Nguyen
*Attorney, Agent, or Firm*—Scully, Scott, Murphy & Presser; Jay P. Sbrollini, Esq.

[57] ABSTRACT

The present invention is directed to a real-time controllable reflection mapping function which covers all stereoscopic directions of space. More specifically, the surface of a mirrored object is segmented into a plurality of polygonal elements (for example, triangles). Then, a polyhedron, which includes a predetermined point (for example, the center of the mirrored object) in a three-dimensional space (for example, a cube) in the interior thereof, is generated and a rendering process is performed for each surface of the polyhedron with the predetermined point as a view point. The rendered image is stored. Thereafter, a reflection vector is calculated between each vertex of the polygonal elements and a view point used when the entire three-dimensional space is rendered. Next, the surface of the polyhedron, in which an intersecting point between the reflection vector with the predetermined point as a start point and the polyhedron exists, is obtained. The coordinate in the image, which corresponds to each vertex of the polygonal elements, is calculated by using the surface where the intersecting point exists and the reflection vector. The image is texture-mapped onto the surface of the object by using the coordinate in the image which corresponds to each vertex of the polygonal elements. Finally, the result of the texture mapping is displayed.

16 Claims, 8 Drawing Sheets

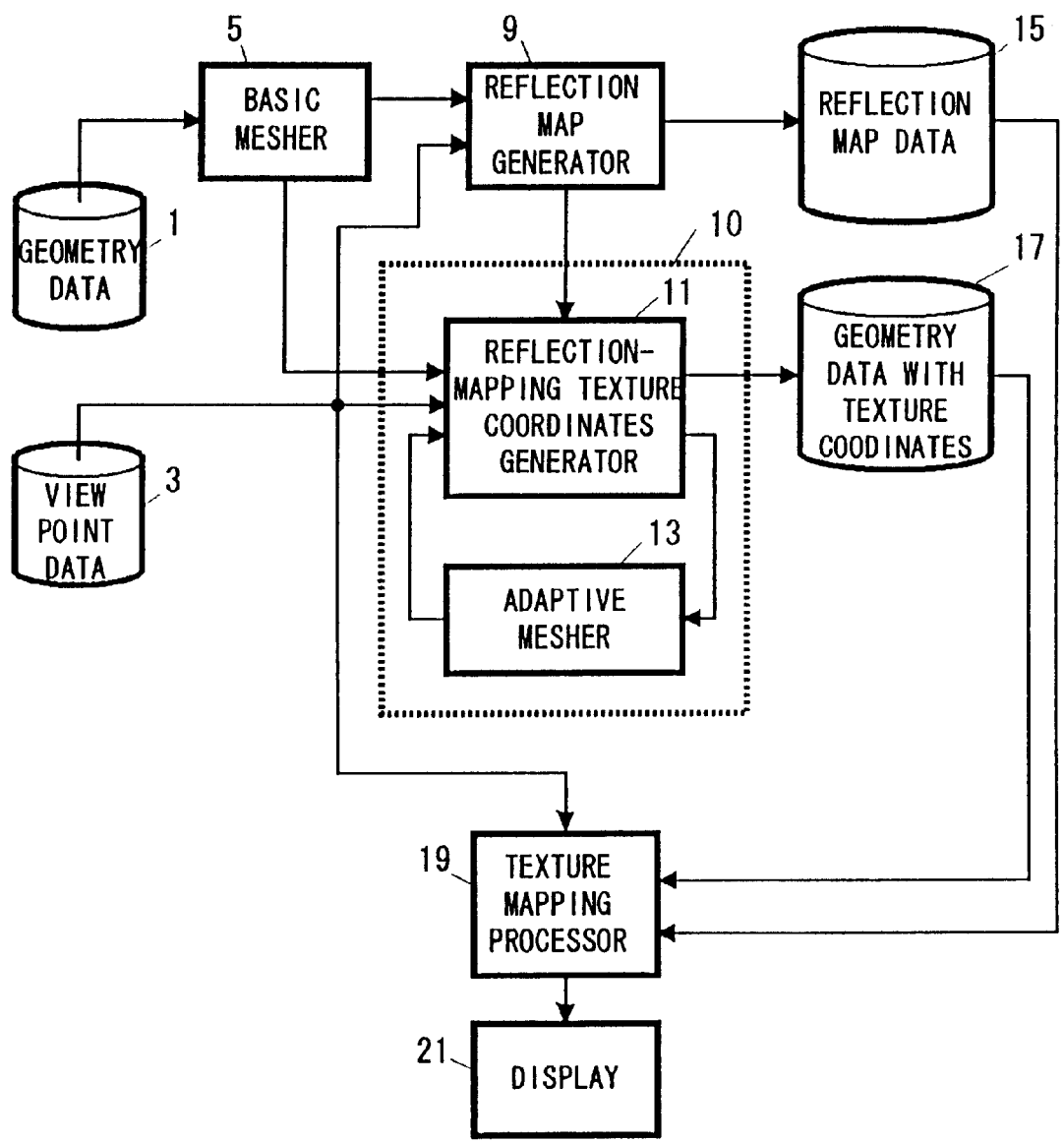
F I G. 1

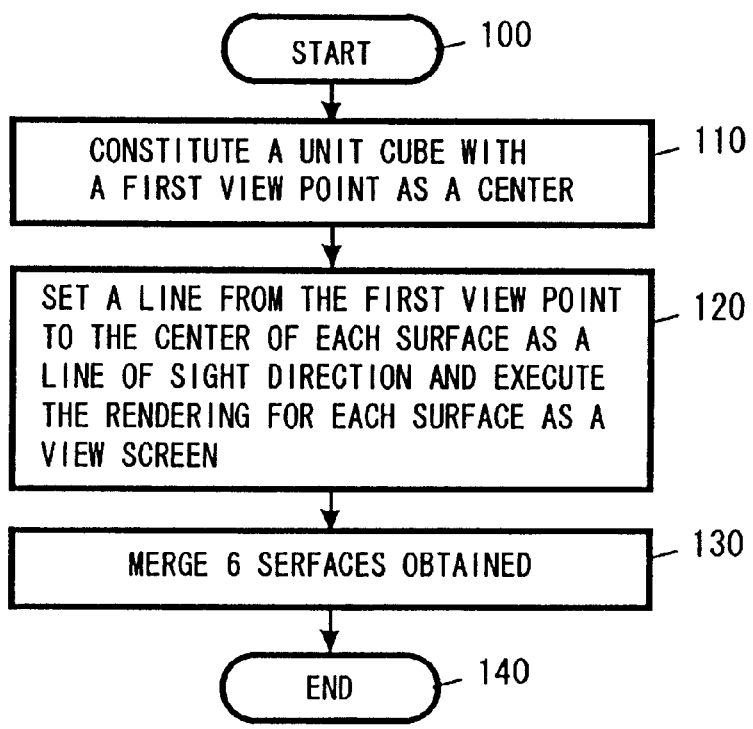
F I G. 2
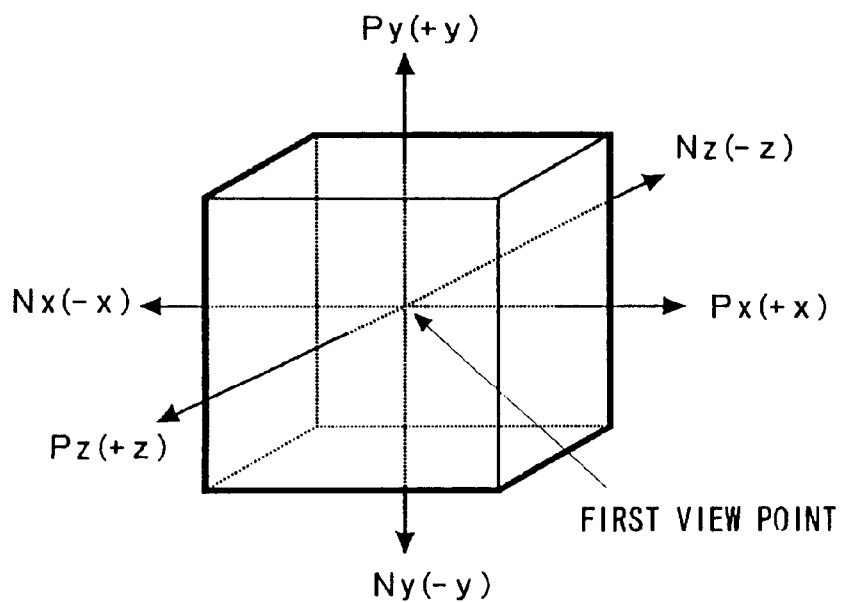
F I G. 3

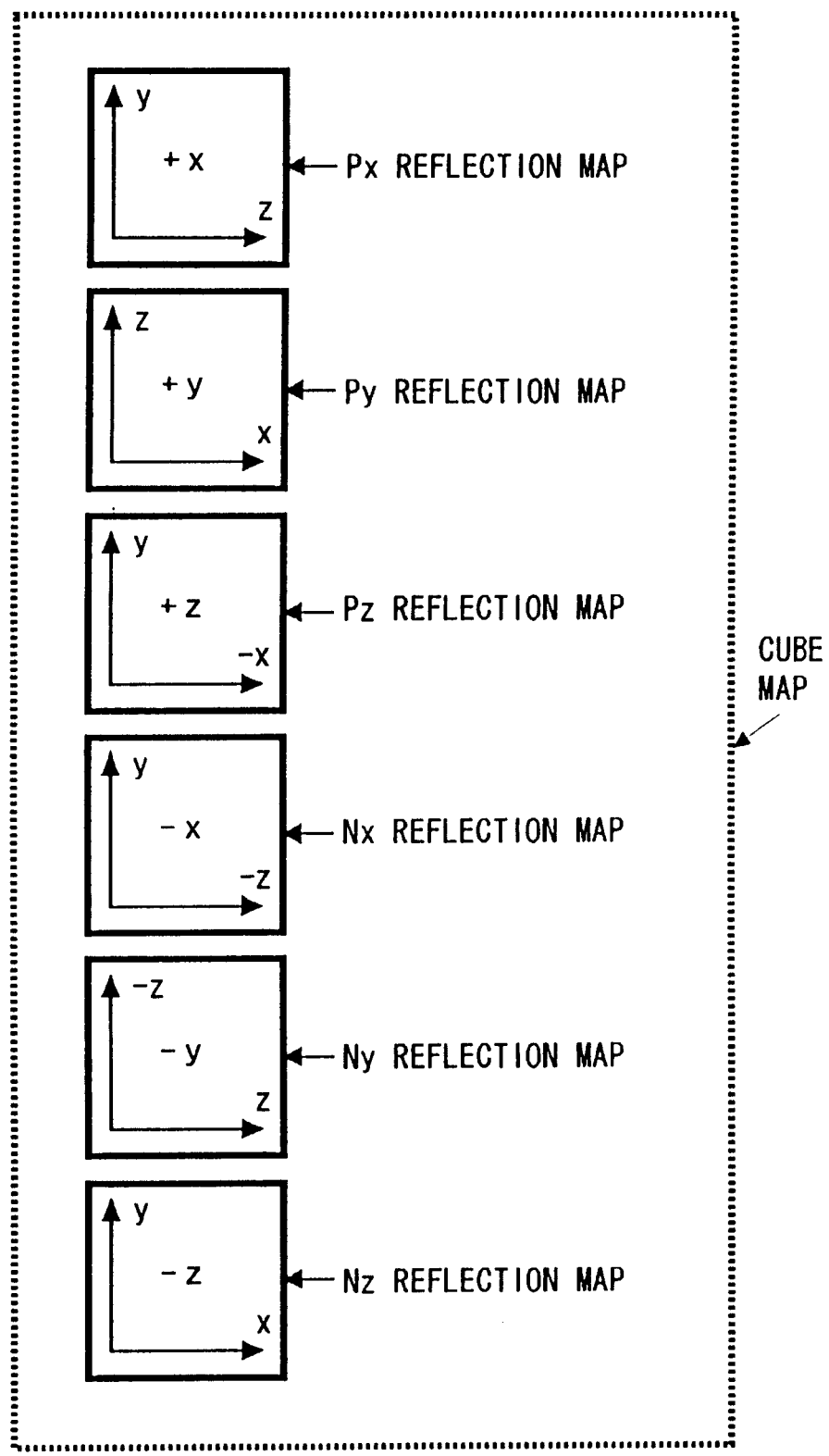
F I G. 4

RENDERING METHOD AND APPARATUS

BACKGROUND OF THE INVENTION

1. Technical Field

The present invention relates to a rendering method which uses texture mapping in the field of computer graphics, and more particularly to a rendering method where reflection mapping (also called environment mapping) is applied when a three-dimensional space including an object with a mirror is given.

2. Prior Art

The reflection mapping in VRML (for example, version 2.0), in addition to the OpenGL (trademark of Silicon Graphics Inc.) of a graphic API (application program interface) being now most extensively used, has been positioned as an important reality enhancement method which simply simulates "mirroring" at high speed. The reflection mapping is one of the texture mapping methods and simulates global reflection effects by accessing textures with reflection vectors which are dynamically determined for each vertex together with the movement of a view point, instead of accessing textures with static texture coordinates appendant to the vertices of an object (for example, see N. Greene, "Environment Mapping and Other Applications of World Projections," IEEE Computer Graphics and Applications, Vol. 6, No. 11, 21–29, November 1986).

The texture which is used in the reflection mapping is called a reflection map (or an environment map) and normally describes the surrounding "environments" viewed from a certain point in space. The reflection map adopted in OpenGL is an image in the form called a spherical map equivalent to an image photographed with a fish-eye lens. In addition to the spherical map, there is a cylindrical map used in Quick Time VR (S. E. Chen, "Quick Time VR-An Image-Based Approach to Virtual Environment Navigation," Proc. SIGGRAPH 95, 29–38, 1995) and a cube map or a Mercator map used in RenderMan (S. Upstill, The RenderMan™ Companion, Addison-Wesley Publishing Co., 1992).

The reflection map has frequently been used as a substitute for ray tracing, because it is convenient and operated at high speed. However, since the reflection map is made around a certain point in space, it has the inherent problem that the distortion becomes larger as going away from the point and that a global hidden relationship also becomes inaccurate. Particularly, in OpenGL, the reflection mapping, where texture coordinates are automatically generated by a sphere, has another problem. That is, there is the problem that (1) all directions (stereoscopic angle 720°) cannot be covered, (2) distortion is large in the vicinity of the equator of a sphere, and (3) reflection vectors are generated only with a view point coordinate system.

An approach to directly realize reflection mapping by a Z buffer method of software such as the aforementioned RenderMan or Green method and an approach to realize reflection mapping by a sort of ray tracing method such as a Watt method (A. Watt and M. Watt, "Advanced Animation and Rendering Techniques," Addison-Wesley, 1992) are known as a reflection mapping method which does not employ the API of three-dimensional computer graphics (CG) such as OpenGL. However, either output is an image or color value data and not geometric data of a triangle (polygon) with texture coordinates. Furthermore, there is the disadvantage that a view point cannot be moved in real time.

As a method of realizing reflection mapping with hardware, there is hardware by which Phong shading is performed at a pixel level. This hardware has been proposed by Voorhies et al (D. Voorhies and J. Foran, "Reflection Vector Shading Hardware," Proc., SIGGRAPH'94, 163–166, 1994). However, because the hardware is special hardware, it cannot be used by users who have been familiar with API such as OpenGL.

SUMMARY OF THE INVENTION

From the foregoing, an objective of the present invention is to provide a real-time controllable reflection mapping function which covers all stereoscopic directions of space.

Another objective of the present invention is to render a "mirroring" phenomenon at high speeds by making use of the texture mapping function which has normally been prepared, that is, a function of mapping textures from the texture coordinates at vertices in geometry data.

Still another objective of the present invention is to adaptively subdivide the polygon of the surface of a mirrored object for enhancing quality.

More specifically, the present invention is directed to a method for rendering a three dimensional space which includes an object with a mirror, comprising the steps of (a) segmenting the surface of said object into a plurality of polygonal elements (for example, triangles); (b) generating a polyhedron (for example, a cube), which includes a predetermined point (for example, the center of the object with the mirror) in the three-dimensional space in the interior thereof, performing a rendering process for each surface of the polyhedron with the predetermined point as a view point, and storing the rendered image; (c) calculating a reflection vector at each vertex of the polygonal elements from a view point used when the entire three-dimensional space is rendered; (d) identifying the surface of the polyhedron in which an intersecting point between the reflection vector with the predetermined point as a start point and the polyhedron exists, and calculating a coordinate in the rendered image, which corresponds to each vertex of the polygonal elements, by using the surface where the intersecting point exists and the reflection vector; (e) performing a texture-mapping of the rendered image onto the surface of the object by using the coordinate in the rendered image which corresponds to each vertex of the polygonal elements; and (f) displaying the result of the texture mapping. The images, generated for surfaces of the polyhydedron by the rendering process, may be stored as a sheet of image, and coordinate values in the sheet may be given to each point.

The present invention is further directed to an apparatus for rendering a three-dimensional space which includes an object with a mirror, comprising (a) a mesher for segmenting the surface of said object into a plurality of polygonal elements; (b) a reflection map generator for generating a polyhedron which includes a predetermined point in said three-dimensional space in the interior thereof and for performing a rendering process for each surface of said polyhedron with said predetermined point as a view point and for storing the rendered image; (c) means for calculating a reflection vector at each vertex of said polygonal elements from a view point used when the entire three-dimensional space is rendered; (d) a coordinate generator for identifying a surface of said polyhedron in which an intersecting point between said reflection vector with said predetermined point as a start point and said polyhedron exists, and for calculating a coordinate in said rendered image which corresponds to each vertex of said polygonal elements by using said surface where said intersecting point exists and said reflection vector; (e) a texture mapping processor for performing a texture mapping of said rendered image onto said surface of said object by using said coordinate in said rendered image which corresponds to each vertex of said polygonal elements; and (f) a display for displaying a result of the texture mapping.

The present invention is still further directed to a mirrored object rendering program for causing a computer to render a three-dimensional space which includes an object with a mirror, comprising the steps of (a) when a plurality of polygonal elements obtained by segmenting the surface of said object, a polyhedron which includes a predetermined point in said three-dimensional space in the interior thereof, and an image generated by performing a rendering process for each surface of said polyhedron with said predetermined point as a view point are prepared; (b) causing said computer to calculate a reflection vector at each vertex of said polygonal elements from a view point used when the entire three-dimensional space is rendered; and (c) causing said computer to identify a surface of said polyhedron in which an intersecting point between said reflection vector with said predetermined point as a start point and said polyhedron exists and causing said computer to calculate a coordinate in said rendered image which corresponds to each vertex of said polygonal elements by using said surface where said intersecting point exists and said reflection vector.

BRIEF DESCRIPTION OF THE DRAWINGS

Preferred embodiments of the present invention will now be described, by way of example only, with reference to the accompanying drawings, in which:

FIG. 1 is a functional block diagram of the present invention;

FIG. 2 is a diagram for explaining the flow for generating a reflection map and a cube map;

FIG. 3 is a diagram for explaining a cube which is used in the flow of FIG. 2;

FIG. 4 is a diagram showing the cup map of the present invention;

DETAILED DESCRIPTION OF THE PREFERRED EMBODIMENTS OF THE INVENTION

Figure 5:
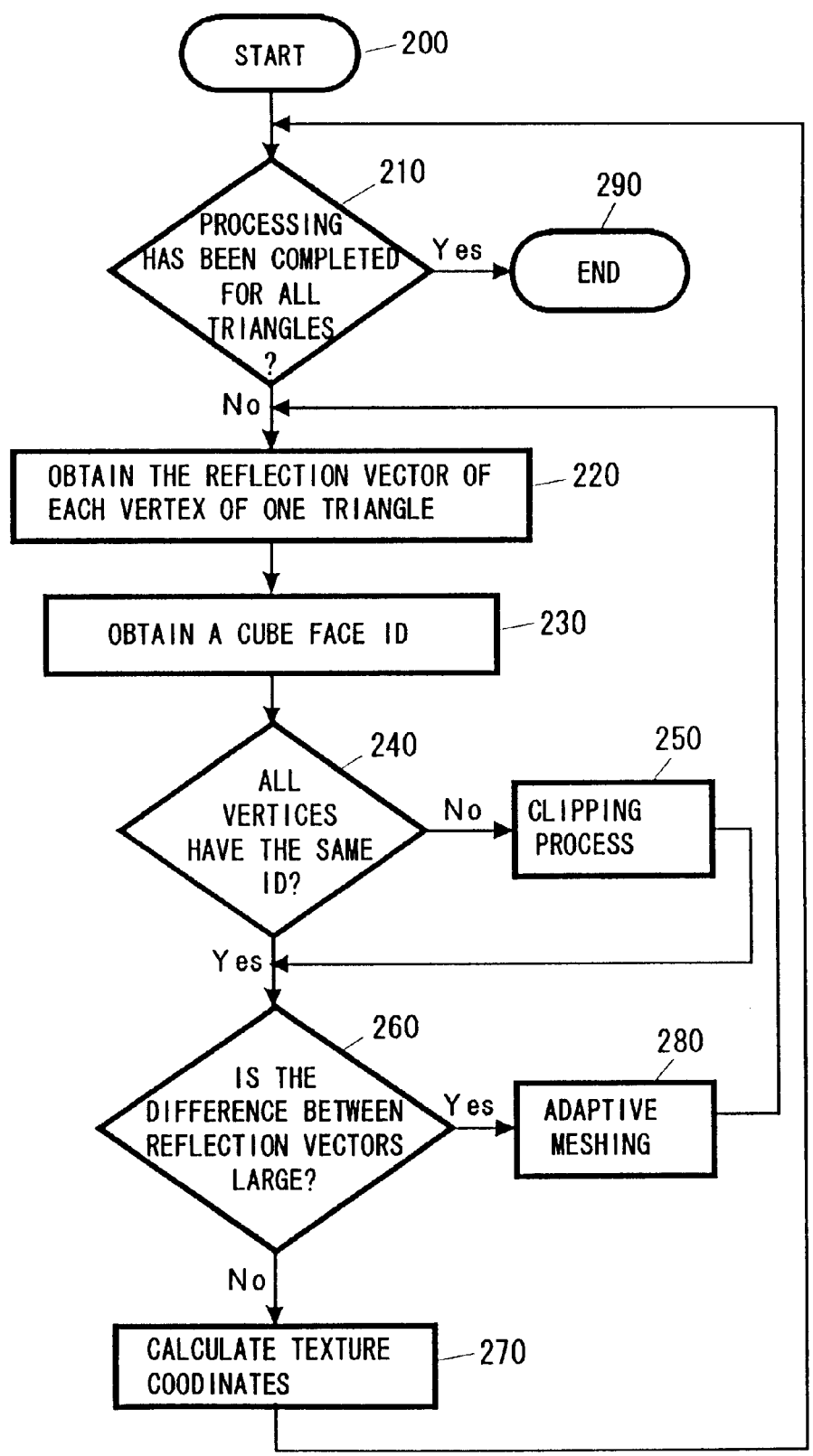
FIG. 5 is a flowchart for explaining the processing step of a texture coordinates generator.

With respect to the method of the present invention directed to rendering a three-dimensional space which includes an object with a mirror, as described above, when the coordinates of the image are checked, it is inspected whether the surfaces where the intersecting point exists are all identical for each vertex of a certain polygonal element. The reason why this check is performed is that, if all surfaces are not identical, the region of the image (coordinates in the region) for mapping cannot be specified with only the information obtained up to this. Therefore, when all surfaces are not identical, the polyhedron is clipped by a polygonal pyramid whose apex is the predetermined point and whose ridgeline is the reflection vector of each vertex of the certain polygonal element, and a reflection vector on a boundary line of each surface of the polyhedron is calculated. Then, the coordinate in the rendered image, which corresponds to the reflection vector on the boundary line, is calculated from the reflection vector on the boundary line. Next, a point on the object, which corresponds to the reflection vector on the boundary line, is calculated.

When each surface of the polyhedron is clipped with a polygonal pyramid, the region of the image for mapping, normally becomes a polygon. Therefore, the polygon may be further segmented into triangles. This segmentation is for the following texture mapping process.

When a point on the object with the mirror is calculated, the point on the object may be calculated by (1) internally dividing, from a ratio of angles formed by the reflection vector on the boundary line and two reflection vectors employed when the reflection vector on the boundary line is calculated, two points on the object which correspond to the two reflection vectors. Also, the point on the object may be calculated by (2) calculating a reflection vector at the middle point between the two points on the object which correspond to two reflection vectors employed when the reflection vector on the boundary line is calculated, judging whether the difference between the reflection vector on the middle point and the reflection vector on the boundary line is less than a predetermined value, and when the difference is not less than the predetermined value, executing the step of calculating a reflection vector at the middle point and subsequent steps by using the middle point and either of the two points as the two points in the step of calculating a reflection vector at the middle point.

Furthermore, it may be judged whether the difference between reflection vectors at the vertices of a certain polygonal element is greater than a threshold value. When the difference is greater than the threshold, the certain polygonal element may be subdivided. With this, picture quality can be further enhanced.

In FIG. 1 there is shown a block diagram of the entire function of the present invention. Geometry data 1 is input to a basic mesher 5. The output of the basic mesher 5 and view point data 3 are input to a reflection-mapping texture coordinates generator 11. The output of the basic mesher 5 is also input to a reflection map generator 9, together with the output of the view point data 3. The output of the reflection map generator 9 is reflection map data 15. The information of the reflection map generator 9 is also employed in the reflection-mapping texture coordinates generator 11. The output of the reflection-mapping texture coordinates generator 11 is geometry data with texture coordinates 17. When occasion demands, the output of the reflection-mapping texture coordinate generator 11 is processed by an adaptive mesher 13 and then is again processed by the reflection-mapping texture coordinates generator 11. The reflection map data 15, the geometry data with texture coordinates 17, and the view point data 3 are input to a texture mapping processor 19, the result of which is sent to a display 21. The essential part of the present invented is a part 10 enclosed by a dotted line. Each block will hereinafter be described.

(1) Geometry data 1

The geometry data is expressed, for example, in the external file format of RenderMan called RIB (RenderMan Interface Bytestream) or the external file format of VRML (Virtual Reality Modeling Language) called WRL. The content of the geometry data includes the shape, position, and orientation, and attributes (such as color, gloss, reflectance and absorptance, transparency, and use of a texture) of an object. As the kind of a geometrical shape of an object, there is a polygon, a surface of the second order, a bicubic patch, and NURBS (Non-Uniform-Rotational B-Spline). Although needed later, the normal vector of an object's surface is also included in the geometry data. If the object's surface is flat, one normal vector needs to be defined. In a more complicated object, a normal vector needs to be defined for each surface. With this, when polygonal segmentation is later performed by the basic mesher 5, the normal vector at each vertex can be simply obtained.

For instance, an example, expressed in RIB format, is shown as follows. This is an example of the case where a spherical mirrored object has been placed at the center of a cube room with different surrounding textures and where an instruction has been given so that the reflection mapping of the present invention is applied to the spherical mirrored object.

Note that texture coordinates, which can be dynamically mirrored by reflection-mapping texture coordinate generator 11 of the present invention, are generated for all objects having a surface attribute called surface "shinymetal." The texture are a reflection map where the texture called "reflectionmap. tex" has previously been made by the reflection map generator 9.

In addition, normal texture mapping is given to an object having a surface attribute called surface "paintedPlastic" and normal Phong shading (no textures) is given to an object having a surface attribute called surface "plastic."

In the normal texture mapping, the texture coordinates, which starts with a key word "st" after a polygon instruction, must be given apparently, while, in the reflection mapping, texture coordinates do not need to be specified apparently because they are automatically generated.

TABLE 1

Definition of a ceiling (here, there is only a light source but no textures)
    Surface "plastic" "Ka" 0.1 "Kd" 1 "Ks" 0.25
        "roughness" 0.25 "specularcolor" [1 1 1]
    Color [0.5 0.6 0.5]
    Polygon "P" [0 221 0 216 221 0 216 221 215 0 221 215]
Definition of a light source (surface light source) of the center of a ceiling
    Surface "plastic" "Ka" 0.3 "Kd" 1 "Ks" 1
        "roughness" 0.25
    Color [1 1 0.7]
    AttributeBegin
    AreaLightSource "arealight" 7 "emission" [70 70 70]
    Polygon "P" [85.5 220 90 130.5 220 90 130.5 220 130 85.5 220 130]
    AttributeEnd
Definition of a front surface
    Surface "paintedplastic" "texturename" "lady.tex"
        "Ka" 0.1 "Kd" 1 "Ks" 1 "roughness" 0.25
        "specularcolor" [1 1 1]
    Color [0.5 0.5 0.5]
    Polygon "P" [0 0 0 216 0 0 216 221 0 0 221 0]
        "st" [0 0 1 0 1 1 0 1] texture coordinates TABLE 1-continued

Definition of a back surface
    Surface "paintedplastic" "texturename" "pingora.tex"
        "Ka" 0.1 "Kd" 1 "Ks" 1 "roughness" 0.25
        "specularcolor" [1 1 1]
    Color [0.5 0.5 0.5]
    Polygon "P" [0 0 215 216 0 215 216 221 215 0 221 215]
        "st" [0 0 1 0 1 1 0 1] texture coordinates
Definition of a floor
    Surface "paintedplastic" "texturename" "plank.tex"
        "Ka" 0.1 "Kd" 1 "Ks" 1 "roughness" 0.25
        "specularcolor" [1 1 1]
    Color [0.5 0.5 0.5]
    Polygon "P" [0 0 0 0 215 216 0 215 216 0 0]
        "st" [0 0 2 0 2 2 0 2] texture coordinates
Definition of a right surface
    Surface "paintedplastic" "texturename" "red.tex"
        "Ka" 0.1 "Kd" 2 "Ks" 1 "roughness" 0.25
        "specularcolor" [1 1 1]
    Color [0.5 0.5 0.5]
    Polygon "P" [0 0 0 0 221 0 0 221 215 0 0 215]
        "st" [1 0 1 1 0 1 0 0] texture coordinates
Definition of a left surface
    Surface "paintedplastic" "texturename" "ground.tex"
        "Ka" 0.1 "Kd" 2 "Ks" 1 "roughness" 0.25
        "specularcolor" [1 1 1]
    Polygon "P" [216 0 215 216 221 215 216 221 0 216 0 0]
        "st" [1 0 1 1 0 1 0 0] texture coordinates
Definition of a spherical mirrored object which becomes an object of reflection mapping
    TransformBegin
    Surface "shinymetal" "texturename" "reflectionmap.tex"
        "Ka" 0.0 "Ks" 1.0 "Kr" 1.0
    Color [1 1 1]
    Translate 108 100 107.5
    Attribute "rsw" "udivision" 32 "vdivision" 24
        # Approximation of a sphere by 32 × 24 (longitude × latitude) polygons
    Sphere 50 −50 50 360
    TransformEnd The other parameters appendant to the surface attribute are defined as follows:

Ka: ambient coefficient (degree of dim brightness that a surface originally has)

Kd: diffuse reflection coefficient (degree at which reflected light diffuses at a surface in unspecified directions)

Ks: gloss reflection coefficient (degree at which reflected light shines at a surface in specified directions)

Roughness: degree of roughness of a surface (the reciprocal of roughness has an influence on gloss reflection)

Specularcolor: color of gloss reflection

Color: color of diffuse reflection (normally indicates the color of an object)

Emission: illuminance (similar to a watt number) of the RGB of a surface light source (2) View point data 3

The view point data includes a first view point, a second view point, a first view point coordinate system, and a second view point coordinate system. Each of the first and second view points represents the position of an eye in a world coordinate system and is specified by three values, e=(ex, ey, ez). The first view point is employed in the reflection map generator 9 and the second view point is employed in the reflection-mapping texture coordinates generator 11 and the texture mapping processor 19. The first and second view point coordinate systems are expressed by three vectors (specified in the world coordinate system) for determining the X axis, Y axis, and Z axis of the view point coordinate systems, which vectors cross one another at right angles. The first view point coordinate system is for the first view point and the second view point coordinate system is for the second view point. The second view point can be dynamically changed by a user's instruction. That is, the second view point indicates the direction of a space which users desire to display.

(3) Basic mesher 5

The basic mesher 5 segments an object in a three-dimensional space, which is rendered, into polygonal elements, based on the information from the aforementioned geometry data 1. Here, the object is segmented into triangular elements. However, it is also possible to segment the object into other polygonal elements, such as rectangular elements. The objectives of the present invention can be achieved if the mirrored object is segmented into triangular elements. Note that the present invention is independent upon the manner of triangulation and may use a bubble meshing method (see Published Unexamined Patent Application No. 7-230487) or Delaunay triangulation (see F. P. Preparata and M. I. Shamos, Computational Geometry: an introduction, Springer-Verlag, 1985). The data which are generated by the triangulation are at least the coordinates and normal vector of each vertex of a triangular element.

(4) Reflection map generator 9

The reflection map generator 9 uses the output of the basic mesher 5. However, as evident in the following description, it is also possible to process the data of the geometry data 1. As described above, the reflection map generator 9 also uses the data of the first view point and the data of the first view point coordinate system. The first view point needs to be in a position where the surroundings of the mirrored object can be viewed. For example, if the mirrored object is a sphere, it is desired that the first view point is in the center. Also, the first view point does not need to be a single point. In the case where the mirrored object is a long and narrow object, a plurality of first view points are provided so that all stereoscopic angular directions can be covered with smaller distortion.

The following processing will be performed for a single first view point (see FIG. 2). The first view point is set so as to constitute the center of a unit cube in order to cover all stereoscopic angular directions so that distortion becomes as small as possible (step 110). This unit cube can be generalized as a polygon, but it is convenient for the unit cube to cover all stereoscopic angular directions. The unit cube is defined as an object where the first view point is located at the center and which occupies a space from −1 to +1 in each axial direction. The size is 2 because the range is from −1 to +1, but this is arbitrary and the length of one edge may be set to 1. Assume that each surface of the unit cube is normal to each axial direction of the first view point coordinate axes. The unit cube consists of 6 surfaces and, for making the following description simpler, a surface normal to the +x axis is called a Px surface (x=1), a surface normal to the −x axis an Nx surface (x=−1), a surface normal to the +y axis a Py surface (y=1), a surface normal to the −y axis an Ny surface (y=−1), a surface normal to the +z axis a Pz surface (z=1), and a surface normal to the −z axis an Nz surface (z=−1).

Next, a line passing from the view point through the center of each surface is taken to be a line-of-sight direction and each surface is taken to be a view screen. Then, normal rendering (including a process such as a hidden surface erasing process) is executed to generate 6 images (step 120). At this time, the field of view is set to 90° so that the ends of the images correspond to each other at the boundary between surfaces. Next, the obtained 6 images are merged into a sheet of image (step 130). This processing is called cube mapping because the merged image is employed as an image projected on the unit cube. Of course, there are many methods of merging images into a sheet of image. The aforementioned RenderMan or Watt employs cube mapping such as the development of a die. The present invention adopts a strip-type merging method such as that shown in FIG. 4. The idea itself of the reflection mapping, based on images projected on 6 surfaces of the unit cube such as this, has been introduced in the aforementioned RenderMan, Green and Watt references. In the first two references a Z buffer method is assumed as a renderer and in Watt reference a beam tracing method (where ray tracing is performed by a prism-shaped ray) is assumed, and either output is an image or a color value. The reflection mapping mechanism itself cannot output triangular data (geometry data) with texture coordinates, as in the present invention.

The data of the cube map, generated by the reflection map generator 9, becomes the reflection map data 15.

(5) Reflection-mapping texture coordinates generator 11

The reflection-mapping texture coordinates generator 11 receives geometry data constituted by a set of polygons (here, triangles) as input data and also receives the second view point and the second view point coordinate system from the view point data 3. Then, the reflection-mapping texture coordinates generator 11 generates texture coordinate which corresponds to each vertex of all triangles which are objects of reflection mapping in input geometry data, and outputs a pair of them (geometry data with texture coordinates 17). The second view point means the direction of space which users specify and desire to display. By cube mapping which covers all stereoscopic angles, generated by the reflection map generator 9, the texture coordinates of each vertex of a triangle to be mapped, always exist somewhere on the cube map. If texture coordinates corresponding to all vertices of a certain triangle exist on the same reflection map (one surface of the cube), the texture coordinates can be easily obtained. However, there are cases where texture coordinates corresponding to all vertices of the certain triangle do not exist on the same reflection map (one surface of the cube), that is, cases where the texture coordinates exist over a plurality of reflection maps. In this case a special process is needed. The process of calculating texture coordinates will hereinafter be described in detail.

First, the entire processing will be described with FIG. 5. Since all triangles of the surface of the mirrored object are processed, it is judged in step 210 whether processing has been ended. When there is a triangle which has not been processed, the triangle is taken out and a reflection vector is obtained for each of the vertices (step 220). This processing will be described in detail later. Then, when the start point of this reflection vector is set to the center (origin) of the cube, there is obtained the cube face ID of the cube which each reflection vector (the half line) crosses (step 230). The process of obtaining this cube face ID will also be described in detail later. As described above, processing varies depending upon the ID corresponding to each reflection vector. Therefore, it is judged whether all vertices of this triangle have the same cube face ID (step 240).

If all vertices of this triangle have the same cube face ID, the texture coordinates can be simply calculated. Since it is judged as an option whether or not the adaptive mesher 13 is employed, it is judged whether the difference between reflection vectors is greater than a predetermined value (step 260). When the difference is less than the predetermined value, texture coordinates are calculated without employing the adaptive mesher 13 (step 270). The process of calculating texture coordinates will also be described in detail later. However, when the difference is greater than the predetermined value, the adaptive meshing is performed (step 280) and step 220 and the subsequent steps are performed again (option).

When, on the other hand, all vertices of a certain triangle do not have the same cube face ID, a clipping process becomes necessary (step 250). This process will be described later. Thereafter, the aforementioned step 260 and the subsequent steps are executed. If texture coordinates can be calculated, the next triangle will be processed, and if all triangles are processed, the processing will end (step 290).

Now, each of the aforementioned processes will be described in detail.

(a) Calculation of reflection vectors

In this processing, the second view point and the normal vector at the vertex of a triangle become necessary. The second view point is obtained from the view point data 3. The normal vector at the vertex of the triangle is prepared in the basic mesher 5 for each vertex of the triangle, but it has basically been defined in the geometry data 1.

Figure 6:
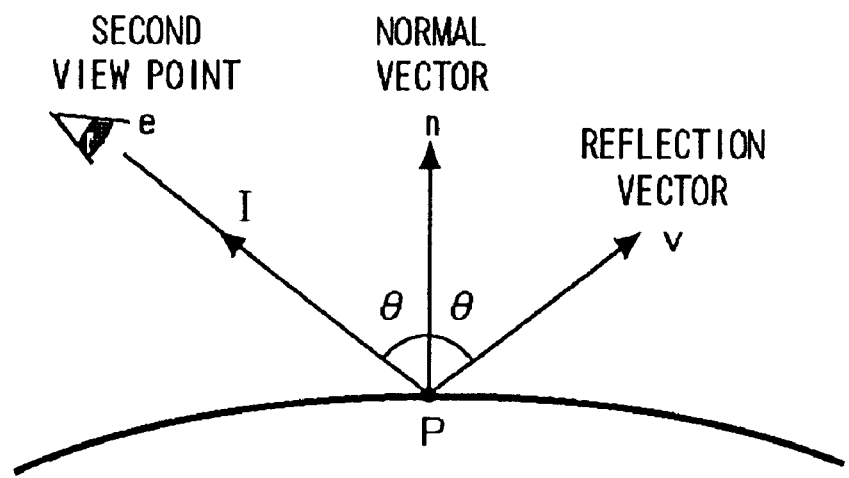
FIG. 6 is a diagram showing the positional relation between a reflection vector, a second view point, and a normal vector.

The reflection vector v, the normal vector n, the second view point e, and the vertex p have a relation such as that shown in FIG. 6. The reflection vector at this vertex p is expressed as follows (v, n, e, p, and I are all expressed by vectors).

$$v = 2(n \cdot 1) - 1$$

where $I = (e-p)/|e-p|$.

(b) Determination of the cube face ID

If the reflection vector v at the vertex p, obtained in the aforementioned way, is expressed by three components, it will become $v=(vx, vy, vz)$. The cube face ID, as defined above, is the ID of the surface of the unit cube which is crossed by the half line, whose direction vector is the reflection vector, where the start point of the reflection vector is set to the center of the cube. Here, among the three components of the reflection vector, the component whose absolute value is greatest is obtained and the sign is also stored. If the sign is positive and the largest component is the x component, the crossed surface is the Px surface and the ID is 1. If the sign is positive and the largest component is the y component, the crossed surface is the Py surface and the ID is 2. If the sign is positive and the largest component is the z component, the crossed surface is the Pz surface and the ID is 3. If the sign is negative and the largest component is the x component, the crossed surface is the Nx surface and the ID is 4. If the sign is negative and the largest component is the y component, the crossed surface is the Ny surface and the ID is 5. Finally, if the sign is negative and the largest component is the z component, the crossed surface is the Nz surface and the ID is 6. Note that the number of the ID is arbitrary and the ID can be numbered in another order.

In addition, in the case where two or more components are the same value and the absolute value equals the maximum value, the priority order is given in order of x component, y component, and z component, and the largest element is considered in this order and selected. However, this priority order is arbitrary and selection may be performed in another order.

(c) Calculation of the texture coordinates

Figure 7:
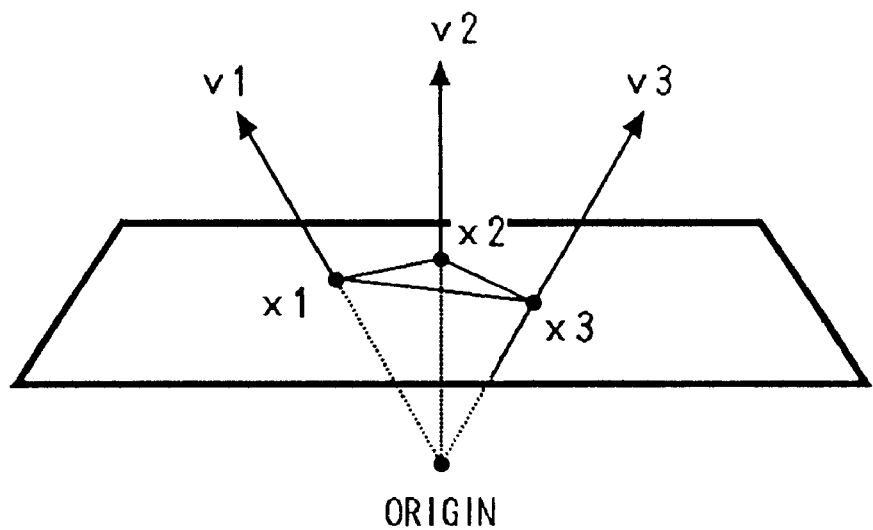
FIG. 7 is a conceptual diagram of the case where the cube faces IDs of the three vertices of the triangle are identical.

If the IDs are identical for all vertices of a certain triangle, that is, if three reflection vectors cross a single surface of the cube as shown in FIG. 7, the texture coordinate at the vertex can be obtained from the previously obtained cube face ID and reflection vector. Now, assume that the 3-component expression of the reflection vector v is $v=(vx, vy, vz)$ and texture coordinate is $(s, t)$. Also, in the following description, "height" is ⅙ and "width" is 1. The former value indicates that the height of the single reflection map is ⅙ of the overall height, because reflection maps are formed into a strip shape when the cub map is generated.

Case of ID=1(Px surface)

$$s = \text{width}*(0.5*(vz/vx+1.0))$$
$$t = \text{height}*(1.0 - 0.5*(vy/vx+1.0))$$

Case of ID=2(Py surface)

$$s = \text{width}*(0.5*(vx/vy+1.0))$$
$$t = \text{height}*(2.0 - 0.5*(vz/vy+1.0))$$

Case of ID=3(Pz surface)

$$s = \text{width}*(1.0 - 0.5*(vx/vz+1.0))$$
$$t = \text{height}*(3.0 - 0.5*(vy/vz+1.0))$$

Case of ID=4(Nx surface)

$$s = \text{width}*(1.0 - 0.5*(vz/vx+1.0))$$
$$t = \text{height}*(4.0 - 0.5*(-vy/vx+1.0))$$

Case of ID=5(Ny surface)

$$s = \text{width}*(0.5*(-vx/vy+1.0))$$
$$t = \text{height}*(5.0 - (1.0 - 0.5*(-vz/vy+1.0))$$

Case of ID=6(Nz surface)

$$s = \text{width}*(0.5*(-vx/vz+1.0))$$
$$t = \text{height}*(6.0 - 0.5*(-vy/vz+1.0))$$

As described above, different processing is performed for each ID.

The equation in the previous part are based on the cube mapping shown in FIG. 4 and varied by the manner in which the cube maps are held (or merged). However, the basic algorithm is that the surface of the cube to which the crossed cube face ID corresponds is obtained and then mapping is performed in the surface (reflection map) to obtain texture coordinates.

(d) Clipping process

As described above, if the cube faces IDs at three vertices are identical, the texture coordinates can be simply obtained with only the aforementioned processing. However, when the cube faces IDs at three vertices are not identical, the aforementioned processing, as it is, cannot be applied because cube faces, which are adjacent to each other in a vector space, are not always adjacent to each other in a texture space (here, on the cube map).

Figure 8:
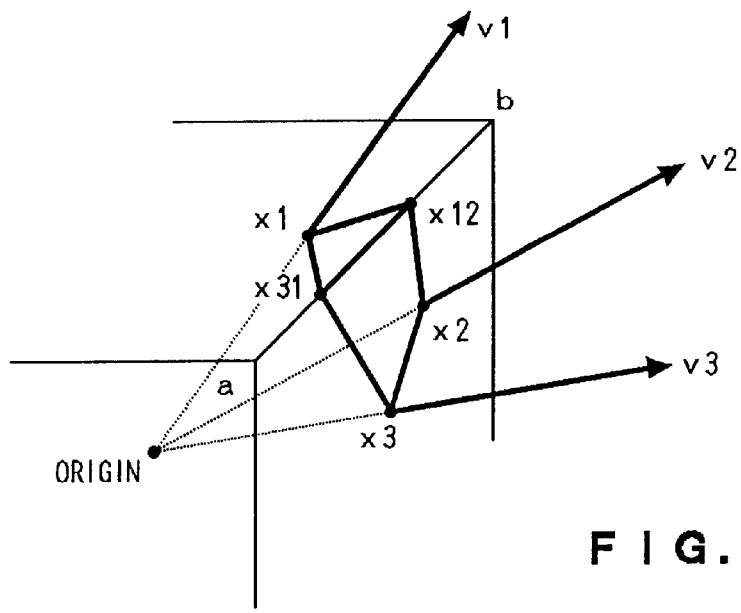
FIG. 8 is a conceptual diagram of the case where the cube faces IDs of the three vertices of the triangle are not identical.

An example of the case where the cube faces IDs at three vertices are not identical is shown in FIG. 8. In this case the surface where the intersecting point X1 of the reflection vector V1 and the cube are contained differs from the surface where the intersecting points X2 and X3 of the cube and the reflection vectors V2 and V3 are contained. In this case there is no guarantee that the region, enclosed by X1, X2, and X3, assures a single region within the cube map. When the region extends over two surfaces, there are cases where the region is separated into two regions. Also, when the region extends over three surfaces, the region is separated into two or three regions. Therefore, the process of obtaining those regions becomes necessary.

Figure 9:
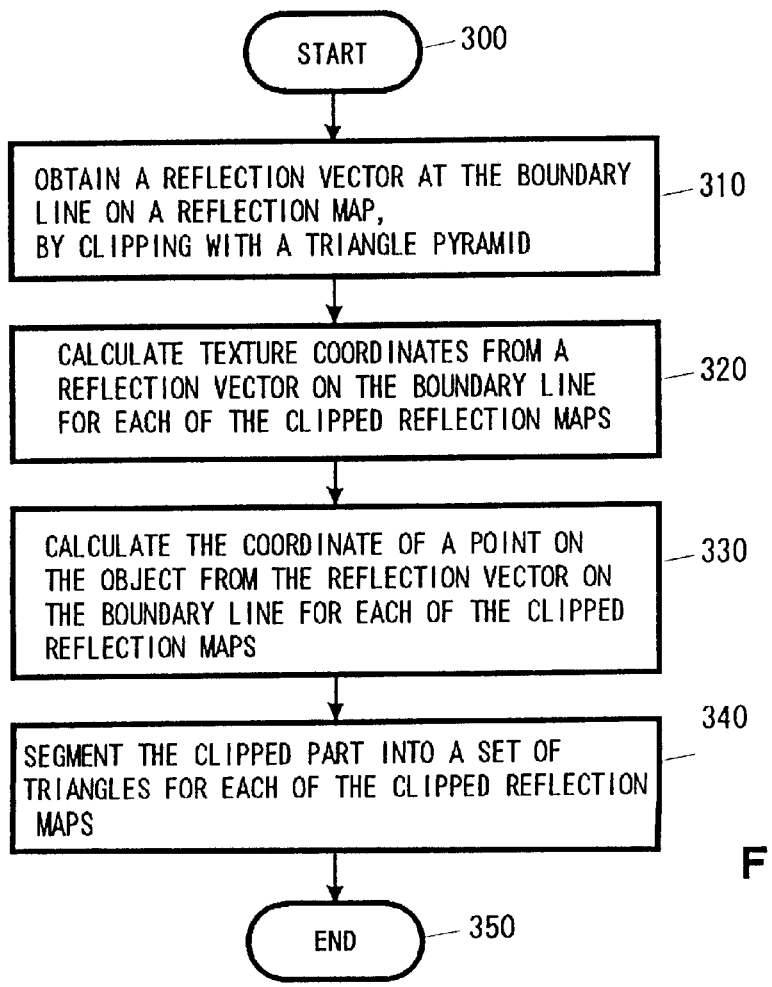
FIG. 9 is a diagram for explaining the flow of the clipping process of the present invention.

The clipping process in this embodiment is different from a normal clipping process of geometry data (such as line or polygon data). That is, in a normal clipping process, the shape of geometry data which is clipped is given, a window which is clipped is given, and a geometric figure which is viewed within the window is obtained. On the other hand, the clipping process in this embodiment means that the unit cube is clipped with a triangular cone (infinite triangular cone) where the origin is taken to be the apex and three reflection vectors are taken to be the ridgelines. This process will hereinafter be described in detail (FIG. 9).

First, the unit cube is clipped with the triangular cone (infinite triangular cone) where the origin (of the unit cube) which is the first view point is taken to be the apex and three reflection vectors are taken to be the ridgelines. Then, the reflection vector on the boundary line of the reflection map (cube face) is obtained (step 310). In the example of FIG. 8, when the unit cube is cut at the surface constituted by V1 and V2, the intersecting point X12 on the boundary line ab of the cube face is obtained. The vector extending from the origin to the intersecting point X12 becomes a reflection vector V12 which should be obtained. Also, when the unit cube is cut at the surface constituted by V1 and V3, the intersecting point X31 on the boundary line ab of the cube face is obtained. The vector extending from the origin to the intersecting point X31 becomes another reflection vector V31.

If additional reflection vectors are obtained in the aforementioned way, the corresponding texture coordinates will be calculated from the reflection vectors for each of the clipped reflection maps by the method of the aforementioned "(c) Calculation of texture coordinates" (step 320). Also, the coordinate of a point on the mirrored object is calculated from the reflection vectors for each of the clipped reflection maps (step 330). This calculation is the reverse of the calculation in the aforementioned processing. This is generally a nonlinear conversion and will be described in detail later. Then, the clipped part is segmented into a set of triangles for each of the clipped reflection maps (step 340). This step is carried out because there are many cases where the texture mapping processor 19 is usually constructed so as to handle triangles. If the texture mapping processor can also handle polygons, there is no need to carry out the step. In the example of FIG. 8, the part, which is clipped in the reflection map (cube face) that crosses V2 and V3, is a region enclosed by X12, X31, X3, and X2. This part is segmented into two triangles. It is arbitrary which two points are connected, so the part may be segmented in any way.

If done in the aforementioned way, the clipping process can be carried out and texture coordinate will be generated for each vertex of a triangle which includes points newly generated on the mirrored object. However, the point on the mirrored object corresponding to the newly obtained reflection vector is not immediately obtained as described above. A description will hereinafter be made of the method of obtaining the coordinate of the point on the mirrored object.

Here, there are proposed two methods. The first method is a method where, from the ratio of angles formed by a reflection vector on the boundary line and two reflection vectors employed when the reflection vector on the bound-ary line is obtained, two points on the mirrored object corresponding to the two reflection vectors are internally divided. More specifically, the two reflection vectors, employed when the reflection vector on the boundary line is obtained, are taken to be v1 and v2 and the reflection vector on the boundary line is taken to be v. Also, assume that the coordinate values of the points on the mirrored object corresponding to v1 and v2 are p1 and p2 (p1 and p2 are handled as vectors). With this, the angles θ1 and θ2 which are employed for interior ratio calculation are obtained as follows.

$$\theta 1 = \arccos(v1 v)$$

$$\theta 2 = \arccos(v2 v)$$

Then, the coordinate value p of the point on the mirrored object corresponding to the reflection vector v are obtained as follows.

$$p = (\theta 2 p1 + \theta 1 p2)/(\theta 1 + \theta 2)$$

If a given triangle is sufficiently small, this method will give a considerably better approximation.

In order to obtain a more accurate approximation, the second method is adopted. This method is a method where the reflection vector at the middle point between the two points on the mirrored object which correspond to two reflection vectors employed when the reflection vector on a boundary line is obtained is calculated and the above calculation is iterated by using the middle point and either of the two points as the two point in the above calculation in an iterative dichotomizing method, until the difference becomes sufficiently small between the reflection vector at the middle point and the obtained reflection vector on the boundary line. The pseudo codes of the program for actually carrying out this method will hereinafter be shown.

TABLE 2

Given reflection vector v0 at the boundary;
Given eye position e;
Initialize counter cnt = 0;
Initialize two end points (p1,p2), their normals (n1,n2) and their reflection vectors (v1,v2);
while (TRUE) {
p = 0.5 * (p1 + p2)
n = (n1 + n2)/|(n1 + n2) |;
v = getReflectVector (e,p,n);
delta = getReflectionVectorDifference (v,v0);
if (delta < THRESHOLD) {/*convergence*/
  return (p);
}
else if (cnt > COUNTMAX) {
*/the number of iterations has reached the limit*/
return (p):
}
delta1 = getReflectionVectorDifference (v1,v0);
delta2 = getReflectionVectorDifference (v2,v0);
cnt = cnt + 1;
If (delta1 < delta2) {/*next search is between p1 and p*/
p2 = p;
n2 = n;
v2 = v;
}
else {/*next search is between p2 and p*/
p1 = p;
n1 = n;
v1 = v;
}
}

The essential part of the aforementioned algorithm is that an interval (p1, p2) is iteratively narrowed during the time that the difference is large between the reflection vector v0 on the boundary line and the reflection vector v given back by the function of "getReflectVector". The stop condition of the algorithm is whether the difference between reflection vectors v and v0, which is given by the variable delta, becomes smaller than a threshold value THRESHOLD or whether the number of iterations becomes equal to COUNT-MAX. Here, the function of "getReflectVector" (e,p,n) is a function which calculates and gives back, from the second view point e, coordinate point p, and a normal vector n at that point, a reflection vector at that point, based on the equation given in the paragraph number [0029]. The function of "getReflectionVectorDifference" (v1,v2) is a function which represents the difference between two reflection vectors and, in this embodiment, the value of the function is given by the sum of squares of the difference between components.

When three reflection vectors have different cube faces IDs respectively, they are clipped by three polygons such as including the lattice point of one corner of the unit cube. Even in this case, the intersecting point between the triangular cone and each edge of the unit cube can be obtained by the aforementioned algorithm. Therefore, the reflection vector and the texture coordinates are also obtained. However, the process of backwardly calculating the coordinate of a point on the mirrored object backward differs. More specifically, the coordinates of the point on the mirrored object corresponding to the intersecting point on each edge of the cube can be obtained by using the aforementioned first and second methods as they are, but, in such a case, the coordinate value of the point on the mirrored object of the corner itself of the cube also have to be obtained.

Here, the method of internally dividing the angle ratio is applied to obtain three vertices. Assume that three reflection vectors are v1, v2, and v3 and a reflection vector at the corner is v. Also, the coordinate values of points on the mirrored object of the three reflection vectors are taken to be p1, p2, and p3. At this time, the angles $\theta 1$, $\theta 2$, and $\theta 3$ for interior ratio calculation are obtained as follows.

$\theta 1 = \arccos(v1 \cdot v)$ $\theta 2 = \arccos(v2 \cdot v)$ $\theta 3 = \arccos(v3 \cdot v)$ Then, the coordinate p of the point on the mirrored object corresponding to the reflection vector v of the corner is obtained as follows.

$p = ((\theta 2 + \theta 3)p1 + (\theta 3 + \theta 1)p2 + (\theta 1 + \theta 2)p3)/(\theta 1 + \theta 2 + \theta 3)$ Note that it is also possible to apply the aforementioned iterative dichotomizing method in a flat manner.

Even in the case where the aforementioned 3 reflection vectors all have different cube faces, the process of segmenting part in each reflection map into triangles is performed for texture mapping.

With the processing performed up to this, the preparation of the texture mapping has been completed. That is, the coordinates of each vertex of triangles on the mirrored object and texture coordinate are paired and the geometry data 17 with texture coordinates is generated.

(6) Adaptive mesher 13

The aforementioned constitution can obtain information enough for carrying out texture mapping, but, since a triangle is rendered by interpolating the interior, there are cases where this method is unsatisfactory in comparison with a method where rendering is performed for each pixel with sufficient time as in the case of the ray tracing method. Of course, the original triangle can be segmented into smaller elements, but, on the other hand, the amount of data becomes massive and the calculating time becomes slow. For this reason, it is preferable that a triangle, which is subdivided, is adaptively selected so that picture quality can be enhanced. Therefore, the adaptive mesher 13 is selectively employed.

Figure 10:
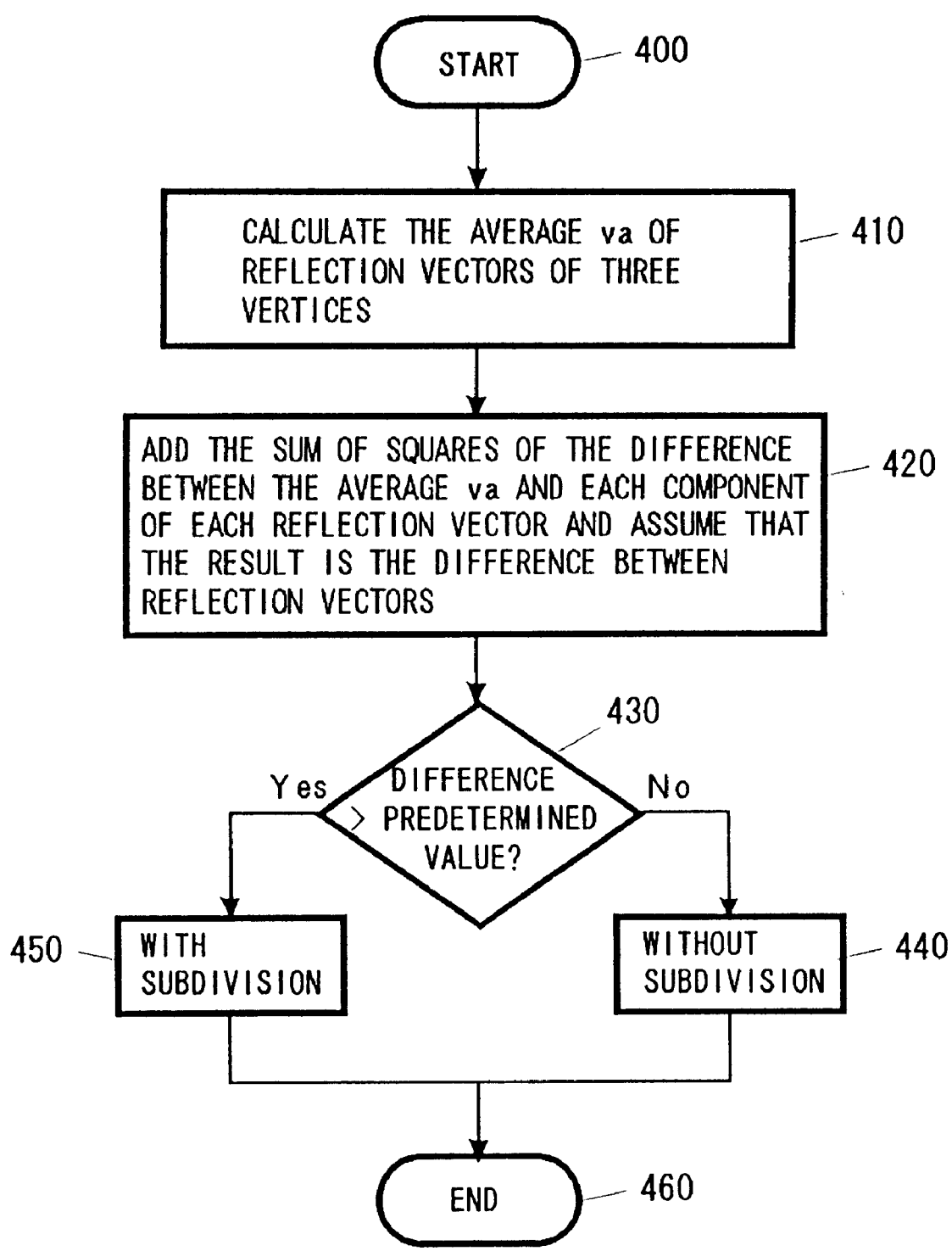
FIG. 10 is a diagram for explaining the processing of an adaptive mesher.

Then, there arises a question of how and what viewpoint a triangle to be subdivided is selected. The triangle has hitherto been selected based on the area of the triangle or the distance from a view point (the second view point of the present invention). However, in the present invention the subdivision of the triangle is judged by whether the difference between the reflection vectors of the three vertices of the triangle is greater than a threshold value. More specifically, the average, va, of the reflection vectors of the three vertices of a certain triangle is first calculated (step 410 of FIG. 10). The sum of squares of the difference between the average va and each component of each reflection vector is added and the addition result is taken to be the difference between three reflection vectors (step 420). It is judged whether this difference is greater than a predetermined value (step 430). When the difference is greater than the predetermined value, the triangle is subdivided (step 450). When, on the other hand, the difference is less than the predetermined value, the triangle is not subdivided (step 440).

If done in the aforementioned way, there will be no possibility that subdivision will be performed when the reflection vector difference is small, even when the area of a triangle is large. On the other hand, even when the area of a triangle is small, there are cases where the triangle will be subdivided if the reflection vector difference is large. The reflection vector, as described above, will change if the view point (second view point) moves. Therefore, if the second view point moves, different triangles will be adaptively subdivided.

Figure 11:
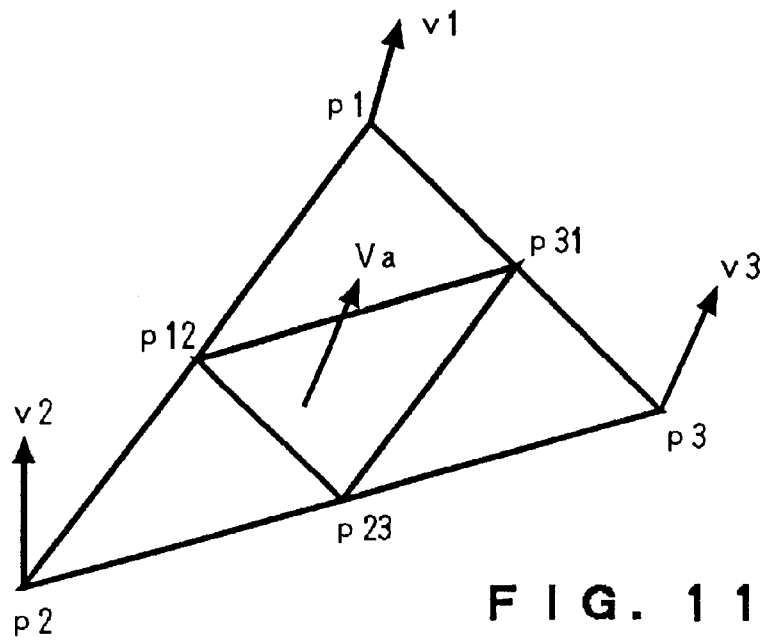
FIG. 11 is a diagram for explaining a method which subdivides a triangle.

Although there are various kinds of subdivisions of a triangle, in the present invention a given triangle is divided into 4 small triangles by connecting the middle points of the edges of the triangle, as shown in FIG. 11, so that a shape as close as possible to the similar figure of the original triangle can be held. This small triangle is reprocessed in step 220 of FIG. 5. The method of performing subdivision by connecting the middle points of edges is merely an example, so subdivision can be performed in other methods. For example, a point is generated in the interior of the triangle and then Delaunay triangulation can be recursively applied (M. F. Cohen and J. R. Wallance, "Radiosity and Realistic Image Synthesis," Academic Press, 1993).

(7) Texture mapping processor 19

With the aforementioned processing, coordinate values and texture coordinates (geometry data 17 with texture coordinates) have been obtained for each vertex of triangles which are on the surface of the mirrored object, and textures which are mapped on the surface of the mirrored object have been prepared. Therefore, a normal texture mapping process can be executed. The normal texture mapping process will not be described any further because it does not form the essential part of the present invention. For a more detailed discussion on the texture mapping process, see J. Neider, "OpenGL Programming Guide," 9 chapter, Addison-Wesley, 1993. The result of the texture mapping is output to a display 21 and is provided to users.

Figure 12:
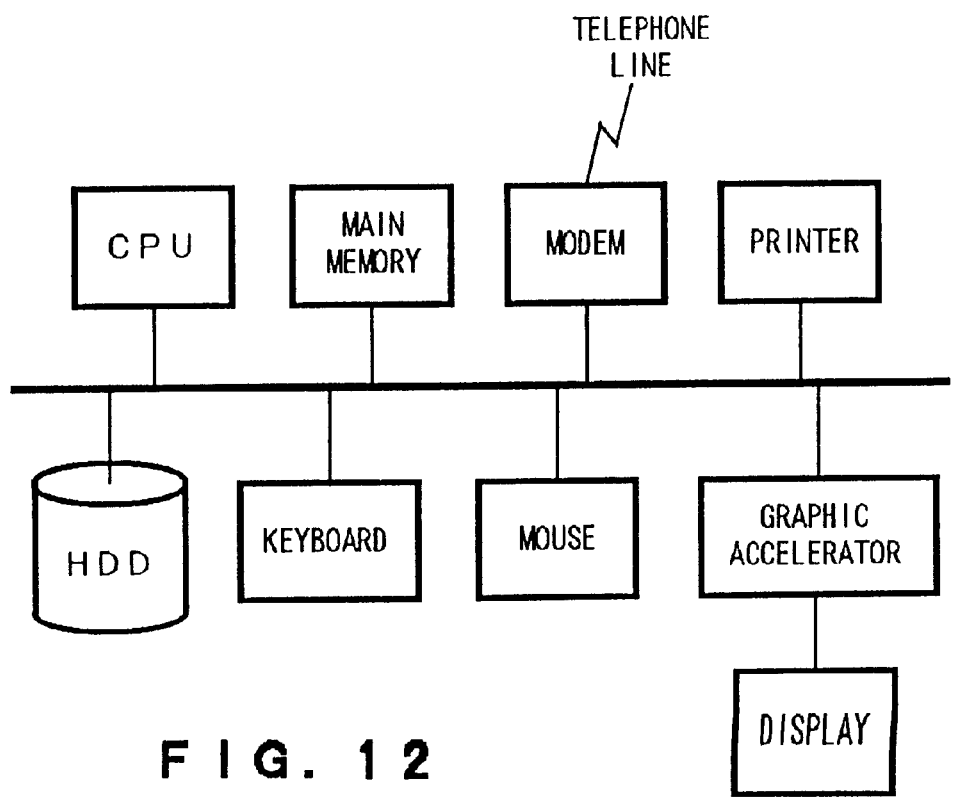
FIG. 12 is a diagram showing the structure of a normal computer.

By performing the aforementioned processing, the objectives of the present invention can be achieved. This processing may be carried out by special hardware which corresponds to the functional block shown in FIG. 1. Also, the processing may be carried out by a computer program. Furthermore, the processing may be carried out by a normal computer, such as a computer shown in FIG. 12. Of course, the computer program may be stored in a storage medium, such as a CD-ROM or a floppy disk, or in other storage devices. Also, there are cases where the computer program is distributed through a communication medium such as an internet.

As described above, the present invention can provide a real-time controllable reflection mapping function which covers all stereoscopic directions of space.

Also, the present invention can render a "mirroring" phenomenon at high speed by making use of the texture mapping function which has normally been prepared, that is, the function of mapping textures from the texture coordinates at vertices in geometry data.

In addition, the present invention can adaptively subdivide the polygon of the surface of the mirrored object for enhancing quality.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patents:

1. A method for rendering a three-dimensional space which includes an object with a mirror, comprising the steps of:

segmenting the surface of said object into a plurality of polygonal elements;

generating a polyhedron which includes a predetermined point in said three-dimensional space in the interior thereof, performing a rendering process for each surface of said polyhedron with said predetermined point as a view point, and storing rendered image;

calculating a reflection vector at each vertex of said polygonal elements from a view point used when the entire three-dimensional space is rendered;

identifying a surface of said polyhedron in which an intersecting point between said reflection vector with said predetermined point as a start point and said polyhedron exists, checking whether the surfaces where said intersecting point exists are all identical for each vertex of one polygonal element; and if all of said surfaces are identical, calculating a coordinate in said rendered image which corresponds to each vertex of said polygonal elements by using said surface where said intersecting point exists and said reflection vector; and if all of said surfaces are not identical, clipping said polyhedron by a polygonal pyramid whose apex is said predetermined point and whose ridgeline is said reflection vector of each vertex of said one polygonal element, and calculating a reflection vector on a boundary line of each surface of said polyhedron;

calculating a coordinate in said rendered image, which corresponds to said reflection vector on said boundary line, from said reflection vector on said boundary line; and calculating a point on said object which corresponds to said reflection vector on said boundary line; and performing a texture-mapping of said rendered image onto said surface of said object by using said coordinate in said rendered image which corresponds to each vertex of said polygonal elements and a calculated point; and displaying a result of the texture mapping.

2. The method according to claim 1, wherein the images, generated for surfaces of said polyhedron by said rendering process, are stored as a sheet of image.

3. The method according to claim 1, wherein said step of calculating a point on said object includes a step of calculating the point on said object by internally dividing, from a ratio of angles formed by said reflection vector on said boundary line and two reflection vectors employed when said reflection vector on said boundary line is calculated, two points on said object which correspond to said two reflection vectors.

4. The method according to claim 1, wherein said step of calculating a point on said object includes the steps of:

calculating a reflection vector at the middle point between the two points on said object which correspond to two reflection vectors employed when the reflection vector on said boundary line is calculated;

judging whether a difference between the reflection vector at said middle point and the reflection vector on said boundary line is less than a predetermined value; and when the difference is not less than the predetermined value, executing the step of calculating a reflection vector at said middle point and subsequent steps by using said middle point and either of said two points as said two points in the step of calculating a reflection vector at said middle point.

5. The method according to claim 3, further comprising the steps of:

judging whether a difference between reflection vectors at the vertices of a certain polygonal element is greater than a threshold value; and if the difference is greater than said threshold, subdividing said certain polygonal element.

6. The method according to claim 3, wherein said polygon is a triangle.

7. The method according to claim 3, wherein said polyhedron is a cube.

8. The apparatus according to claim 7, wherein the images, generated for surfaces of said polyhedron by said rendering process, are stored as a sheet of image.

9. An apparatus for rendering a three-dimensional space which includes an object with a mirror, comprising a mesher for segmenting the surface of said object into a plurality of polygonal elements;

a reflection map generator for generating a polyhedron which includes a predetermined point in said three-dimensional space in the interior thereof and for performing a rendering process for each surface of said polyhedron with said predetermined point as a view point and for storing the rendered image;

means for calculating a reflection vector at each vertex of said polygonal elements from a view point used when the entire three-dimensional space is rendered;

a coordinate generator for identifying a surface of said polyhedron in which an intersecting point between said reflection vector with said predetermined point as a start point and said polyhedron exists, said coordinate generator means including means for checking whether the surfaces where said intersecting point exists are all identical for each vertex of one polygonal element; and if all of said surfaces are identical, said coordinate generator calculating a coordinate in said rendered image which corresponds to each vertex of said polygonal elements by using said surface where said intersecting point exists and said reflection vector;

means for clipping said polyhedron by a polygonal pyramid whose apex is said predetermined point and whose ridgeline is said reflection vector of each vertex of said one polygonal element and for calculating a reflection vector on a boundary line of each surface of said polyhedron, if all of said surfaces are not identical;

means for calculating a coordinate in said rendered image, which corresponds to said reflection vector on said boundary line, from said reflection vector on said boundary line;

means for calculating a point on said object which corresponds to said reflection vector on said boundary lines;

a texture mapping processor for performing a texture mapping of said rendered image onto said surface of said object by using said coordinate in said rendered image which corresponds to each vertex of said polygonal elements and a calculated point; and a display for displaying a result of the texture mapping.

10. The apparatus according to claim 9, wherein said means for calculating a point on said object includes means for calculating the point on said object by internally dividing, from a ratio of angles formed by said reflection vector on said boundary line and two reflection vectors employed when said reflection vector on said boundary line is calculated, two points on said object which correspond to said two reflection vectors.

11. The apparatus according to claim 9, wherein said means for calculating a point on said object includes:

means for calculating a reflection vector at the middle point between the two points on said object which correspond to two reflection vectors employed when the reflection vector on said boundary line is calculated; and means for judging whether a difference between the reflection vector on said middle point and the reflection vector on said boundary line is less than a predetermined value, and if the difference is not less than the predetermined value, for instructing the means for calculating a reflection vector at said middle point by using said middle point and either of said two points as said two point in said means for calculating a reflection vector at said middle point.

12. The apparatus according to claim 11, further comprising:

a judging unit for judging whether a difference between reflection vectors at the vertices of a certain polygonal element is greater than a threshold value; and an adaptive mesher for subdividing said certain polygonal element if the difference is greater than said threshold.

13. A mirrored object rendering program for causing a computer to render a three-dimensional space which includes an object with a mirror, comprising the steps of:

when a plurality of polygonal elements obtained by segmenting the surface of said object, a polyhedron which includes a predetermined point in said three-dimensional space in the interior thereof, and an image generated by performing a rendering process for each surface of said polyhedron with said predetermined point as a view point are prepared;

causing said computer to calculate a reflection vector at each vertex of said polygonal elements from a view point used when the entire three-dimensional space is rendered;

causing said computer to identify a surface of said polyhedron in which an intersecting point between said reflection vector with said predetermined point as a start point and said polyhedron exists causing said computer to check whether the surfaces where said intersecting point exists are all identical for each vertex of one polygonal element; and if all of said surfaces are identical, causing said computer to calculate a coordinate in said rendered image which corresponds to each vertex of said polygonal elements by using said surface where said intersecting point exists and said reflection vector; and, if all of said surface are not identical, causing said computer to clip said polyhedron by a polygonal pyramid whose apex is said predetermined point and whose ridgeline is said reflection vector of each vertex of said one polygonal element, and to calculate a reflection vector on a boundary line of each surface of said polyhedron;

causing said computer to calculate a coordinate in said rendered image, which corresponds to said reflection vector on said boundary line, from said reflection vector on said boundary line; and causing said computer to calculate a point on said object which corresponds to said reflection vector on said boundary line.

14. The program according to claim 13, wherein said step of causing to calculate a point on said object includes a step of causing said computer to calculate the point on said object by internally dividing, from a ratio of angles formed by said reflection vector on said boundary line and two reflection vectors employed when said reflection vector on said boundary line is calculated, two points on said object which correspond to said two reflection vectors.

15. The program according to claim 13, wherein said step of causing to calculate a point on said object includes:

causing said computer to calculate a reflection vector at the middle point between the two points on said object which correspond to two reflection vectors employed when the reflection vector on said boundary line is calculated;

causing said computer to judge whether a difference between the reflection vector at said middle point and the reflection vector on said boundary line is less than a predetermined value; and if the difference is not less than the predetermined value, causing said computer to execute the step of calculating a reflection vector at said middle point and subsequent steps by using said middle point and either of said two points as said two points in said step of causing calculate a reflection vector at said middle point.

16. The program according to claim 13, further comprising the steps of:

causing said computer to judge whether a difference between reflection vectors at the vertices of a certain polygonal element is greater than a threshold value; and causing said computer to subdivide said certain polygonal element if the difference is greater than said threshold.

* * * * *